United States Patent
Wu

(10) Patent No.: US 10,521,576 B2
(45) Date of Patent: Dec. 31, 2019

(54) ELECTRONIC DEVICE AND WORKING MODE SELECTING METHOD THEREOF

(71) Applicant: Chiun Mai Communication Systems, Inc., New Taipei (TW)

(72) Inventor: Tang-Wei Wu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 83 days.

(21) Appl. No.: 15/625,072

(22) Filed: Jun. 16, 2017

(65) Prior Publication Data
US 2017/0364670 A1 Dec. 21, 2017

(30) Foreign Application Priority Data

Jun. 16, 2016 (CN) .......................... 2016 1 0423703

(51) Int. Cl.
*G06F 21/00* (2013.01)
*G06F 21/32* (2013.01)
*G06F 21/62* (2013.01)
*G06K 9/00* (2006.01)
*G06F 21/84* (2013.01)

(52) U.S. Cl.
CPC .......... *G06F 21/32* (2013.01); *G06F 21/6218* (2013.01); *G06K 9/00067* (2013.01); *G06K 9/00087* (2013.01); *G06F 21/84* (2013.01); *G06F 2221/2149* (2013.01)

(58) Field of Classification Search
CPC .......... G06F 21/32; G06F 21/31; G06F 3/041; G06F 3/0416; G06F 21/316
See application file for complete search history.

(56) References Cited

U.S. PATENT DOCUMENTS

| 2014/0026208 A1* | 1/2014 | Coons | G06F 21/32 726/16 |
| 2016/0092018 A1* | 3/2016 | Lee | G06F 21/32 345/173 |
| 2016/0117540 A1 | 4/2016 | Huang | |
| 2017/0063851 A1* | 3/2017 | Kim | H04L 63/0861 |
| 2017/0076080 A1* | 3/2017 | Hao | G06F 21/32 |

FOREIGN PATENT DOCUMENTS

| CN | 105550557 A | 5/2016 |
| CN | 105630314 A | 6/2016 |

* cited by examiner

*Primary Examiner* — Ghazal B Shehni
(74) *Attorney, Agent, or Firm* — ScienBiziP, P.C.

(57) ABSTRACT

A method for an electronic device to restrict functionality according to working mode is provided. The method establishes a fingerprint database, wherein the fingerprint database stores at least one fingerprint of each authorized user for unlocking the electronic device, a finger type corresponding to each fingerprint stored in the fingerprint database, and a preset finger area corresponding to each finger type stored in the fingerprint database. A fingerprint of a user is obtained through a sensor. The fingerprint is matched against database for authorized status and size of fingerprint currently obtained is also analyzed and compared to a preset size of the type corresponding to the obtained fingerprint. The electronic device is unlocked for an authorized user and controlled to enter into an unrestricted working mode for an adult or into a restricted working mode for a child, according to the comparison.

9 Claims, 2 Drawing Sheets

ELECTRONIC DEVICE AND WORKING MODE SELECTING METHOD THEREOF

CROSS-REFERENCE TO RELATED DISCLOSURES

This disclosure claims priority to Chinese Patent Application No. 201610423703.4 filed on Jun. 16, 2016, the contents of which are incorporated by reference herein.

FIELD

The disclosure generally relates to mode-based computer functionality, and particularly to an electronic device and a working mode thereof based on fingerprint identification.

BACKGROUND

Electronic devices such as mobile phones and tablet/personal computers are widely used. The number and types of various application (e.g., shopping, social networking, games, etc.) are always increasing. Application software can enrich functions of the electronic device. Children may have easy access to the electronic devices and the application software thereon. However, some application software are not suitable for children.

BRIEF DESCRIPTION OF THE DRAWINGS

Implementations of the present technology will now be described, by way of example only, with reference to the attached figures, wherein.

DETAILED DESCRIPTION

Figure 1:
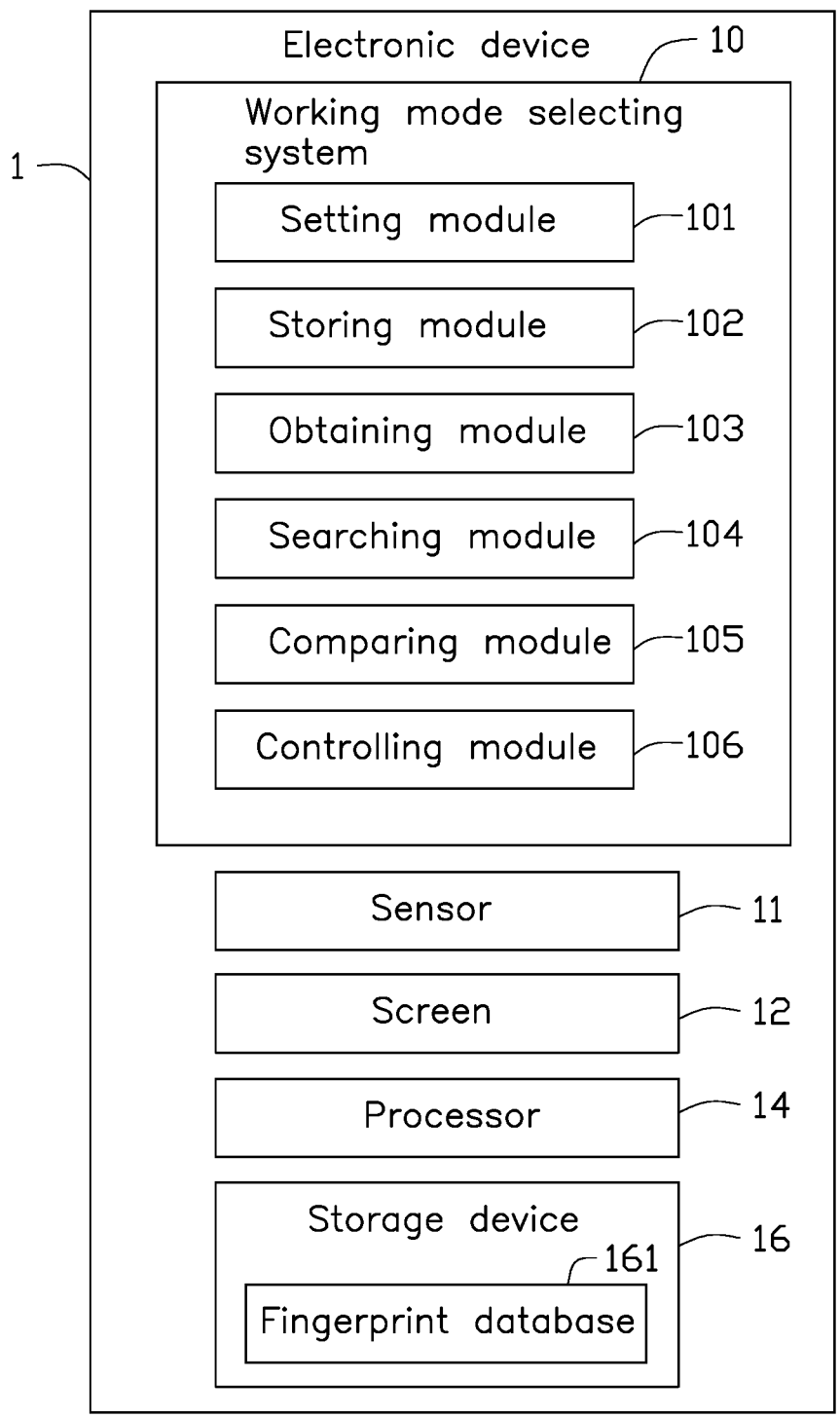
FIG. 1 is a block diagram of an electronic device including a working mode selecting system, according to an exemplary embodiment of the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

FIG. 1 is a block diagram of an electronic device 1 including a working mode selecting system 10, according to an exemplary embodiment of the present application. The electronic device 1 further includes a sensor 11 and a screen 12. The sensor 11 is configured to obtain fingerprints from the touch of a user. In this exemplary embodiment, the electronic device 1 can be a computer, a mobile phone, or other electronic devices. The working mode selecting system 10 can identify the user (e.g. an adult or a child) based on the fingerprints of the user, and select a corresponding working mode of the electronic device 1 for the user. In this exemplary embodiment, the electronic device 1 includes a first working mode and a second working mode. The first working mode is defined as a working mode in which one or more functions of the electronic device 1 are blocked and cannot be used by the user. The one or more functions can be, but are not limited to, making a long distance call, browsing X-rated websites, downloading games, and sending messages. The second working mode is defined as a working mode in which all functions of the electronic device 1 are available and can be used by the user. In this exemplary embodiment, when the working mode selecting system 10 identifies the user as an adult (e.g., age 18 or above), the working mode selecting system 10 selects the second working mode for the user. When the working mode selecting system 10 identifies the user as a child (e.g., age below 18), the working mode selecting system 10 selects the first working mode for the user. The electronic device 1 further includes a screen-locked mode and a screen-unlocked mode.

The electronic device 1 further includes a storage device 16 providing one or more memory functions, and at least one processor 14. In at least one embodiment, the working mode selecting system 10 may include computerized instructions in the form of one or more programs, which are stored in the storage device 16 and executed by the at least one processor 14 to perform operations of the electronic device 1.

The storage device 16 stores one or more programs, such as programs of the operating system, other applications of the electronic device 1, and the fingerprints of the users. In some embodiments, the storage device may include a memory of the electronic device 1 and/or an external storage card, such as a memory stick, a smart media card, a compact flash card, or any other type of memory card. FIG. 1 illustrates only one example of the electronic device 1, other examples may include more or fewer components than as illustrated, or have a different configuration of the various components.

In at least one embodiment, the working mode selecting system 10 may include one or more modules, for example, a setting module 101, a storing module 102, an obtaining module 103, a searching module 104, a comparing module 105, and a controlling module 106. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The setting module 101 can be configured to receive a setting of the first working mode from a first user. In this exemplary embodiment, the setting includes a list of the blocked functions in the first working mode, the blocked functions can be, but are not limited to, making a long distance call, browsing X-rated websites, downloading games, and sending messages. In other embodiment, the setting of the first working mode can be a default setting of the electronic device 1, and the first working mode need not be set. At this time, the setting module 101 can be omitted.

The storing module 102 can be configured to establish a fingerprint database 161. In this exemplary embodiment, the fingerprint database 161 stores at least one fingerprint of each authorized user (including all of the users who are allowed to use the electronic device 1) for unlocking the electronic device 1. The fingerprint database 161 further stores a finger type corresponding to each fingerprint stored in the fingerprint database 161. The storing module 102 (the fingerprint database 161) also can store the fingerprints of some or all of the fingers of each authorized user. For example, the storing module 102 can store the fingerprint of an often used finger only, such as the index finger. The finger types can be divided as two to five types. The five finger types can be thumb, index finger, middle finger, ring finger, and little finger. The four types can be thumb, index finger, middle finger, and other two fingers. The three types can be thumb, index finger, and other three fingers. The two types can be thumb and other four fingers.

The fingerprint database 161 also stores a preset fingerprint area corresponding to each finger type stored in the fingerprint database 161. The preset fingerprint area can be a fingerprint area of the finger of the common adult corresponding to the finger type, or a product of multiplying the fingerprint area of the finger of the common adult by a preset coefficient. The preset fingerprint area can be a default value or a value received from the user by the setting module 101. In other embodiments, the obtaining module 102 can obtain a fingerprint of an adult user and calculate the area of the obtained fingerprint as the preset fingerprint area.

Through the sensor 11, the obtaining module 103 can be configured to obtain a fingerprint of the user and calculate a fingerprint area of the obtained fingerprint.

The searching module 104 can be configured to search whether the obtained fingerprint is stored in the fingerprint database 161 or not. If the obtained fingerprint is in the fingerprint database 161, the searching module 104 determines that the user is allowed to use the electronic device 1. If the obtained fingerprint is not in the fingerprint database 161, the searching module 104 determines that the user is an unauthorized user. When the searching module 104 determines that the user is allowed to use the electronic device 1, the searching module 104 is further configured to search for the finger type corresponding to the obtained fingerprint and the preset fingerprint area corresponding to the finger type of the obtained fingerprint stored in the fingerprint database 161.

The comparing module 105 can be configured to compare the fingerprint area of the obtained fingerprint and the preset fingerprint area. If the fingerprint area of the obtained fingerprint is greater than or equal to the preset fingerprint area, the comparing module 105 determines that the user is an adult. If the fingerprint area of the obtained fingerprint is smaller than the preset fingerprint area, the comparing module 105 determines that the user is a child.

The controlling module 106 can be configured to control the electronic device 1 to enter into the screen-unlocked mode when the searching module 104 determines that the user is allowed to use the electronic device 1. The electronic device 1 is controlled to maintain the screen-locked mode when the searching module 104 determines that the user is unauthorized. The controlling module 106 can be also configured to control the electronic device 1 to enter into the first working mode when the comparing module 105 determines that the user is a child and control the electronic device 1 to enter into the second working mode when the comparing module 105 determines that the user is an adult.

Figure 2:
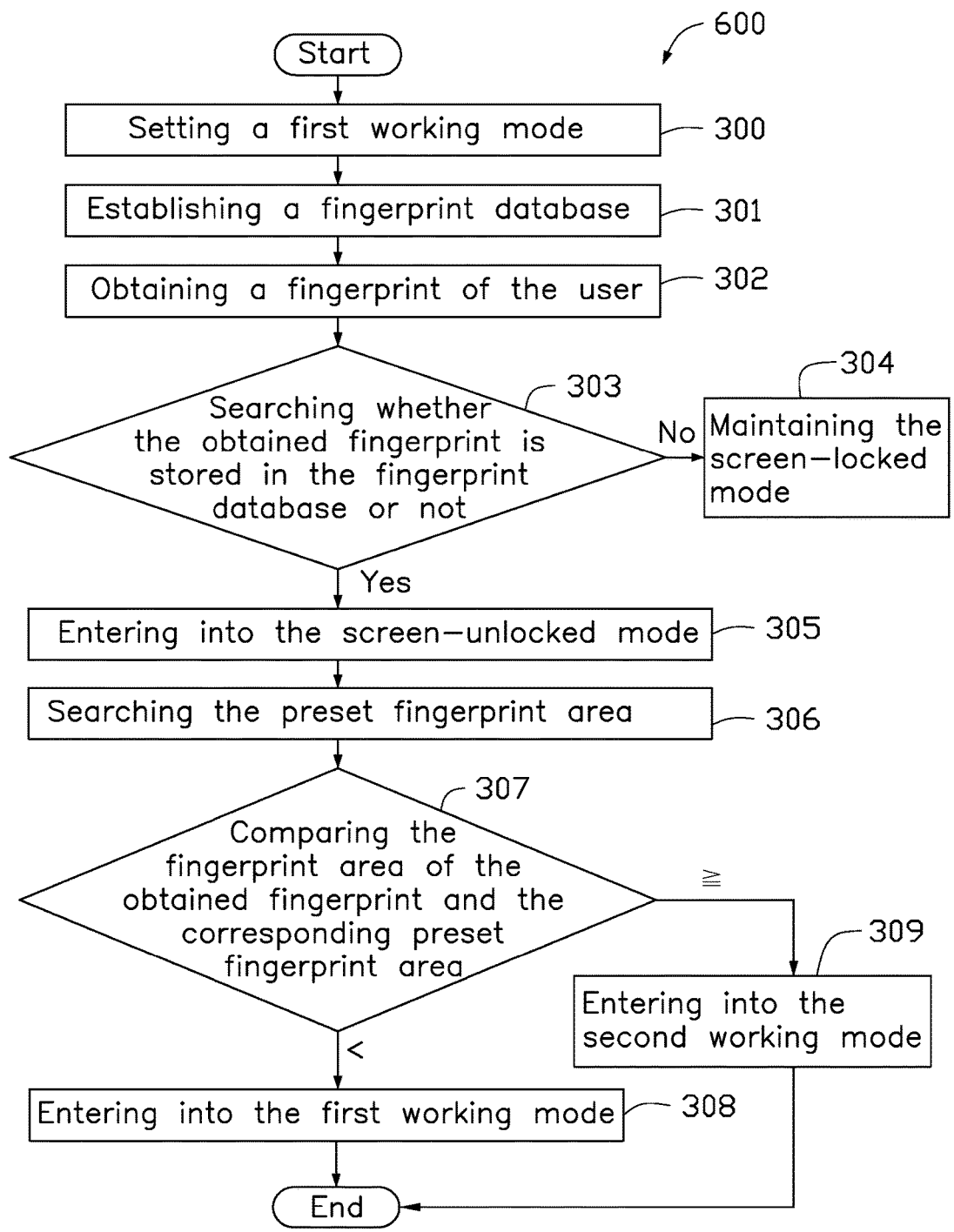
FIG. 2 is a flowchart of a working mode selecting method using the working mode selecting system of FIG. 1, according to an exemplary embodiment of the present application.

FIG. 2 is a flowchart of a working mode selecting method using the working mode selecting system of FIG. 1, according to an exemplary embodiment of the present application. The example method 600 is provided by way of example, as there are a variety of ways to carry out the method. The method 600 described below can be carried out using the configurations illustrated in FIG. 1, for example, and various elements of these figures are referenced in explaining example method 600. Each block shown in FIG. 2 represents one or more processes, methods, or subroutines, carried out in the exemplary method 600. Furthermore, the illustrated order of blocks is by example only and the order of the blocks can change according to the present disclosure. Additional blocks may be added or fewer blocks may be utilized, without departing from this disclosure. The exemplary method 600 can begin at block 300.

At block 300, the setting module 101 receives a setting of the first working mode from the user. In this exemplary embodiment, the setting includes a list of the blocked functions in the first working mode, the blocked functions can be, but are not limited to, making a long distance call, browsing X-rated websites, downloading games, and sending messages. In other embodiments, the setting of the first working mode can be a default setting of the electronic device 1, and the first working mode does not need to be set by the user. At this time, the block 300 can be omitted.

At block 301, the storing module 102 establishes a fingerprint database 161. In this exemplary embodiment, the fingerprint database 161 stores at least one fingerprint of each authorized user (including all of the users who are allowed to use the electronic device 1) for unlocking the electronic device 1. The fingerprint database 161 further stores a finger type corresponding to each fingerprint stored in the fingerprint database 161. The storing module 102 (the fingerprint database 161) also can store the fingerprints of some or all of the fingers of each authorized user. For example, the storing module 102 can store the fingerprint of an often used finger only, such as the index finger. The finger types can be divided as two to five types. The five finger types can be thumb, index finger, middle finger, ring finger, and little finger. The four types can be thumb, index finger, middle finger and other two fingers. The three types can be thumb, index finger, and other three fingers. The two types can be thumb, and other four fingers.

The fingerprint database 161 also stores a preset fingerprint area corresponding to each finger type stored in the fingerprint database 161. The preset fingerprint area can be a fingerprint area of the finger of the common adult corresponding to the finger type, or a product of multiplying the fingerprint area of the finger of the common adult by a preset coefficient. The preset fingerprint area can be a default value or a value received from the user by the setting module 101. In other embodiments, the obtaining module 102 can obtain the fingerprint of an adult user and calculate the area of the obtained fingerprint as the preset fingerprint area.

At block 302, through the sensor 11, the obtaining module 103 obtains a fingerprint of the user and calculates the fingerprint area of the obtained fingerprint.

At block 303, the searching module 104 searches whether the obtained fingerprint is stored in the fingerprint database 161 or not. If the obtained fingerprint is in the fingerprint database 161, the searching module 104 determines that the user is allowed to use the electronic device 1 and the procedure goes to block 305. If the obtained fingerprint is not in the fingerprint database 161, the searching module 104 determines that the user is an unauthorized user and the procedure goes to block 304.

At block 304, the controlling module 106 controls the electronic device 1 to maintain the screen-locked mode.

At block 305, the controlling module 106 controls the electronic device 1 to enter into the screen-unlocked mode, and the procedure goes to block 306.

At block 306, the searching module 104 determines that the user is allowed to use the electronic device 1, and further searches for the finger type corresponding to the obtained fingerprint and the preset fingerprint area corresponding to the finger type of the obtained fingerprint stored in the fingerprint database 161.

At block 307, the comparing module 105 compares the fingerprint area of the obtained fingerprint and the preset fingerprint area. If the fingerprint area of the obtained fingerprint is greater than or equal to the preset fingerprint area, the comparing module 105 determines that the user is an adult and the procedure goes to block 309. If the fingerprint area of the obtained fingerprint is smaller than the preset fingerprint area, the comparing module 105 determines that the user is a child and the procedure goes to block 308.

At block 308, the controlling module 106 controls the electronic device 1 to enter into the first working mode.

At block 309, the controlling module 106 controls the electronic device 1 to enter into the second working mode.

Therefore, the working mode selecting system 10 and method can identify the user based on the fingerprint of the user. When the working mode selecting system 10 determines the user is a child, the electronic device 1 is controlled to enter into the first working mode with some functions of the electronic device 1 blocked. Therefore, the children can be protected from some unsuitable functions of the electronic device 1.

The embodiments shown and described above are only examples. Many details are often found in the art such as the other features. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electronic device comprising:
   a sensor;
   a processor; and
   a storage device configured to store the fingerprint, the storage device further configured to store one or more programs which, when executed by the processor, cause the processor to:
   establish a fingerprint database, wherein the fingerprint database stores at least one fingerprint of each authorized user, for unlocking the electronic device, a finger type corresponding to each fingerprint stored in the fingerprint database, and a preset finger area corresponding to each finger type stored in the fingerprint database, wherein the finger type comprises five finger type, four type, three type, two finger type, and one finger type;
   obtain a fingerprint of a user through the sensor and calculate a fingerprint area of the obtained fingerprint;
   search whether the obtained fingerprint is stored in the fingerprint database or not;
   entering into a screen unlocked mode;
   search for the finger type corresponding to the obtained fingerprint, and the preset fingerprint area corresponding to the finger type of the obtained fingerprint stored in the fingerprint database if the obtained fingerprint is stored in the fingerprint database;
   compare the fingerprint area of the obtained fingerprint and the corresponding preset fingerprint area;
   control the electronic device to enter into a corresponding working mode according to the comparison;
   control the electronic device to enter into a first working mode if the fingerprint area of the obtained fingerprint is smaller than the corresponding preset fingerprint area; and
   control the electronic device to enter into a second working mode if the fingerprint area of the obtained fingerprint is greater than or equal to the corresponding preset fingerprint area.

2. The electronic device according to claim 1, wherein the first working mode is defined as a working mode in which one or more functions of the electronic device are blocked and cannot be used by the user, and the second working mode is defined as a working mode in which all functions of the electronic device are available and can be used by the user.

3. The electronic device according to claim 1, wherein the processor further:
   receives a setting of the first working mode from the user.

4. A computer-implemented method comprising:
   establishing a fingerprint database, wherein the fingerprint database stores at least one fingerprint of each authorized user for unlocking an electronic device, a finger type corresponding to each fingerprint stored in the fingerprint database, and a preset finger area corresponding to each finger type stored in the fingerprint database, and the finger type comprises five finger type, four type, three type, two finger type, and one finger type;
   obtaining a fingerprint of a user and calculating a fingerprint area of the obtained fingerprint;
   searching whether the obtained fingerprint is stored in the fingerprint database or not;
   entering into a screen unlocked mode;
   searching for the finger type corresponding to the obtained fingerprint and the preset fingerprint area corresponding to the finger type of the obtained fingerprint stored in the fingerprint database if the obtained fingerprint is stored in the fingerprint database;
   comparing the fingerprint area of the obtained fingerprint and the corresponding preset fingerprint area;
   controlling the electronic device to enter into a corresponding working mode according to the comparison;
   controlling the electronic device to enter into a first working mode if the fingerprint area of the obtained fingerprint is smaller than the corresponding preset fingerprint area; and
   controlling the electronic device to enter into a second working mode if the fingerprint area of the obtained fingerprint is greater than or equal to the corresponding preset fingerprint area.

5. The method according to claim 4, wherein the first working mode is defined as a working mode in which one or more functions of the electronic device are blocked and cannot be used by the user, and the second working mode is defined as a working mode in which all functions of the electronic device are available and can be used by the user.

6. The method according to claim 4, further comprising:
receive a setting of the first working mode from the user.

7. A non-transitory storage medium having stored instructions that, when executed by a processor of an electronic device, cause the electronic device to perform a method for selecting a working mode of the electronic device, the method comprising:
establishing a fingerprint database, wherein the fingerprint database stores at least one fingerprint of each authorized user for unlocking the electronic device, a finger type corresponding to each fingerprint stored in the fingerprint database, and a preset finger area corresponding to each finger type stored in the fingerprint database, wherein the finger type comprises five finger type, four type, three type, two finger type, and one finger type;
obtaining a fingerprint of a user and calculating a fingerprint area of the obtained fingerprint;
searching whether the obtained fingerprint is stored in the fingerprint database or not;
entering into a screen unlocked mode;
searching for the finger type corresponding to the obtained fingerprint and the preset fingerprint area corresponding to the finger type of the obtained fingerprint stored in the fingerprint database if the obtained fingerprint is stored in the fingerprint database;
comparing the fingerprint area of the obtained fingerprint and the corresponding preset fingerprint area;
controlling the electronic device to enter into a corresponding working mode according to the comparison;
controlling the electronic device to enter into a first working mode if the fingerprint area of the obtained fingerprint is smaller than the corresponding preset fingerprint area; and
controlling the electronic device to enter into a second working mode if the fingerprint area of the obtained fingerprint is greater than or equal to the corresponding preset fingerprint area.

8. The non-transitory storage medium according to claim 7, wherein the first working mode is defined as a working mode in which one or more functions of the electronic device are blocked and cannot be used by the user, and the second working mode is defined as a working mode in which all functions of the electronic device can be used by the user.

9. The non-transitory storage medium according to claim 7, further comprising:
receiving a setting of the first working mode from the user.

* * * * *